123,170

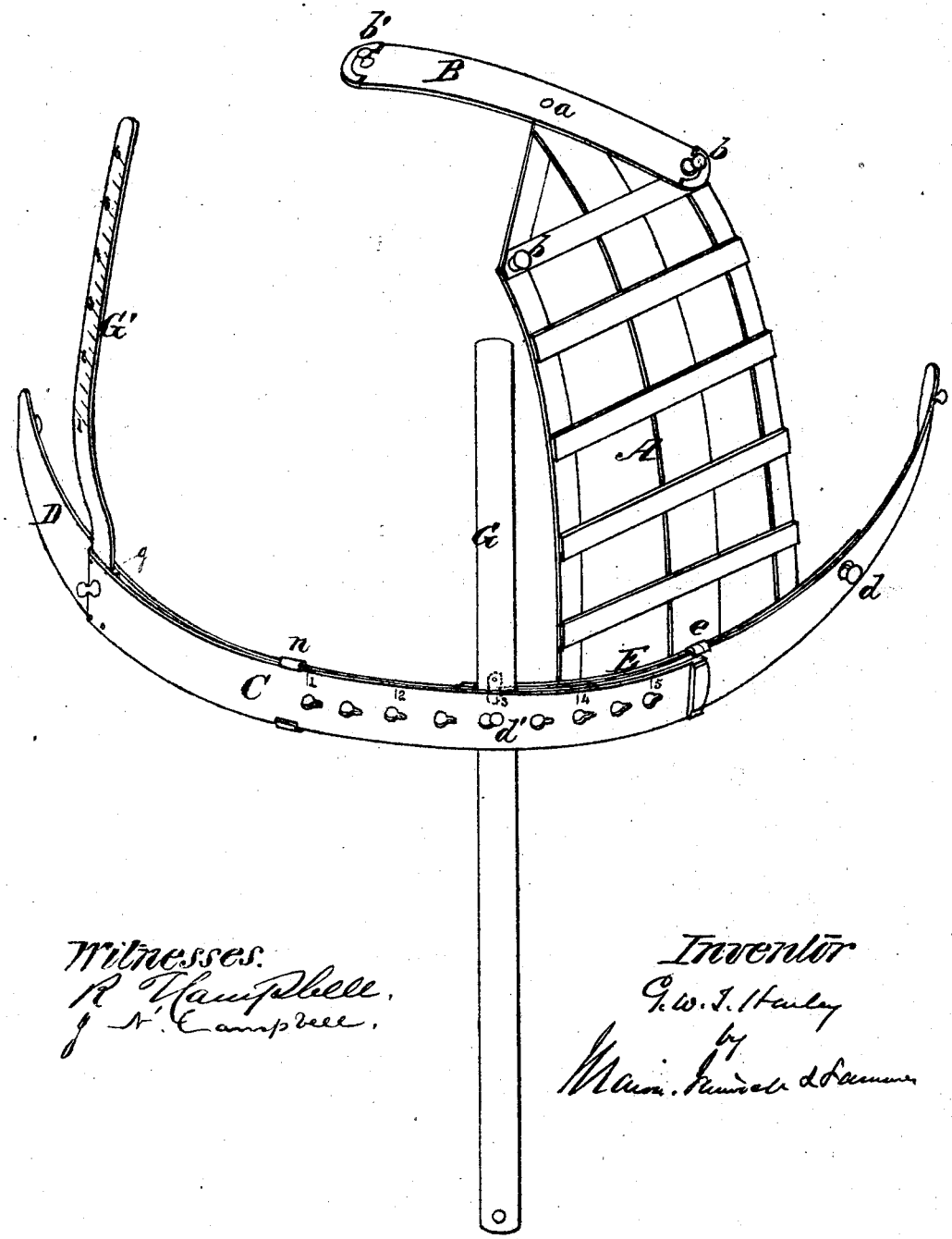

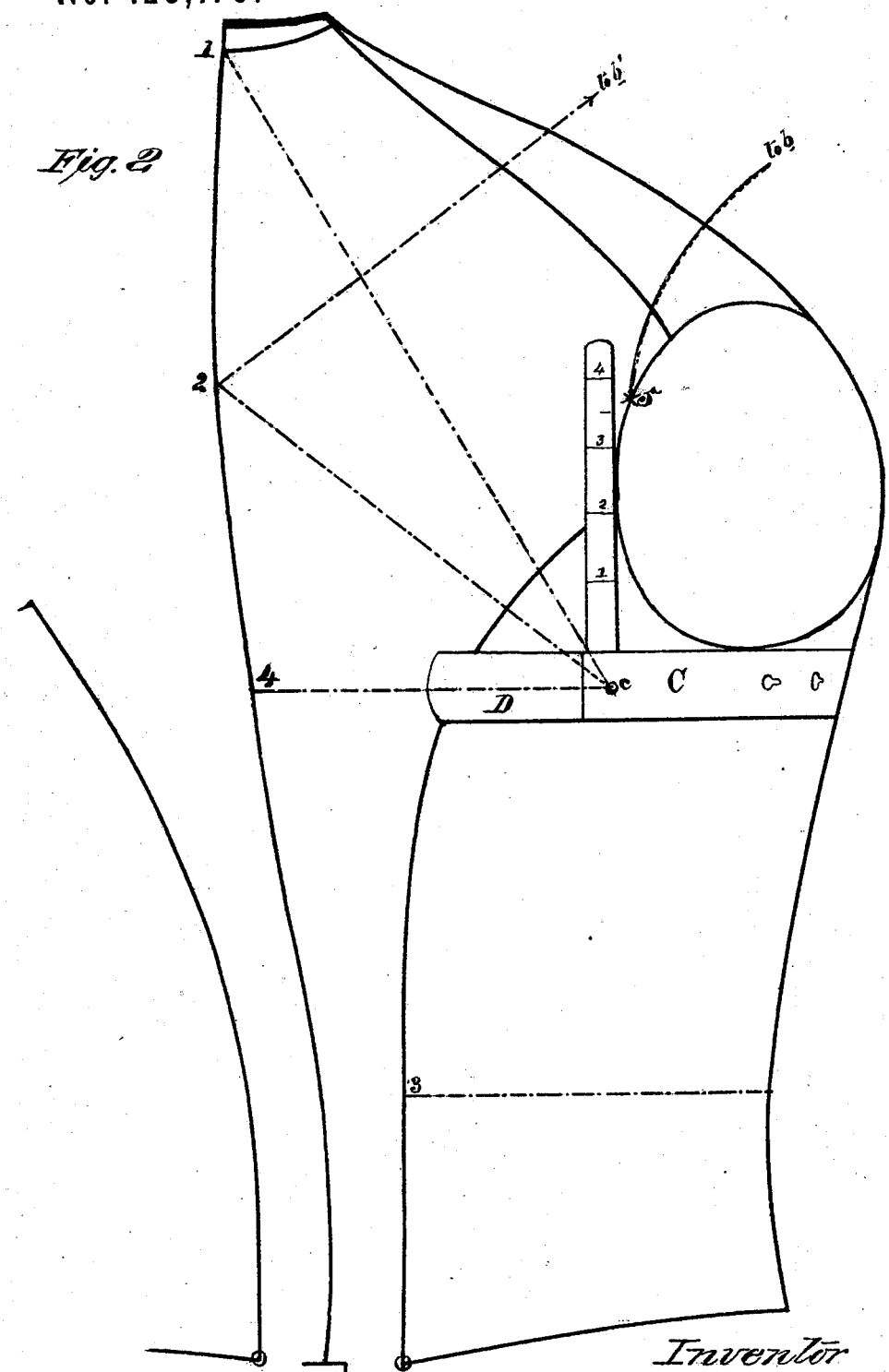

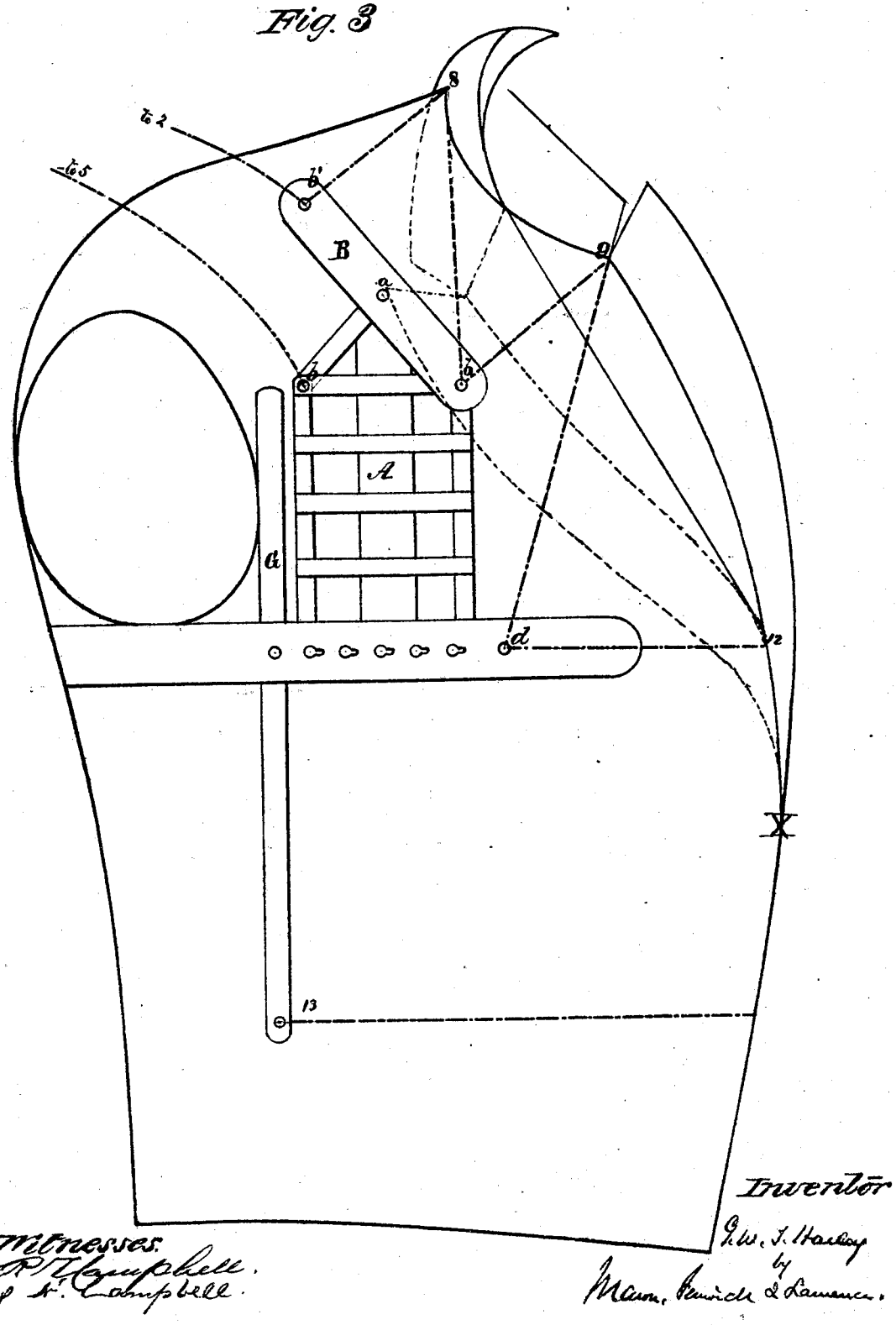

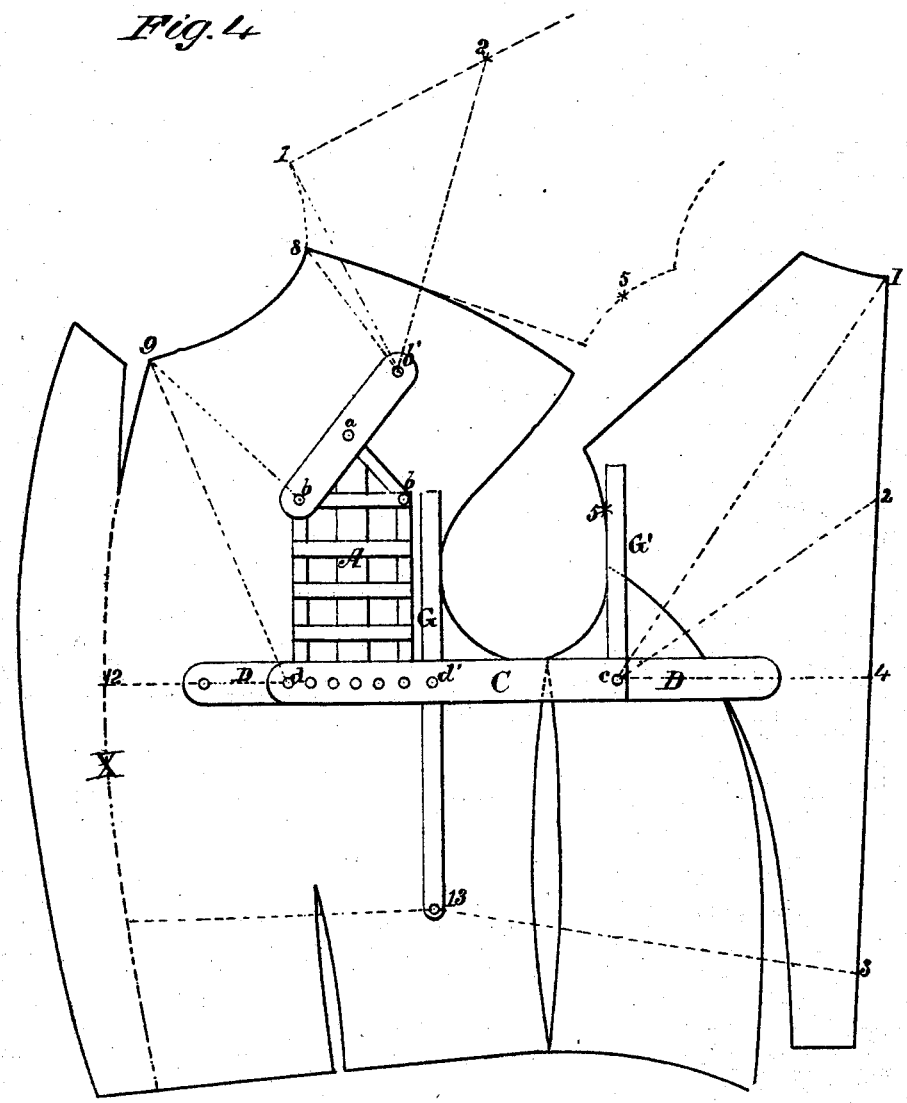

UNITED STATES PATENT OFFICE.

GEORGE W. T. HARLEY, OF FREDERICK, MARYLAND.

IMPROVEMENT IN TAILORS' MEASURES.

Specification forming part of Letters Patent No. 123,170, dated January 30, 1872.

*To all whom it may concern:*

Be it known that I, GEORGE W. T. HARLEY, of Frederick, in the county of Frederick and State of Maryland, have invented an Improved Tailor's Measure; and I do hereby declare that the following is a full, clear, and exact description thereof, reference being had to the accompanying drawing making part of this specification, in which—

Figure 1, Plate 1, is a perspective view of the measuring device or transfer adjusted for the right side of the body. Fig. 2, Plate 2, is a view representing the device applied on the body, and indicating by dotted lines the back-measures. Fig. 3, Plate 3, represents the manner of taking the measures of the front of the body. Fig. 4, Plate 4, is a diagram representing the manner of transferring the measures to the cloth and draughting the front and back.

The object of this invention is to obtain a transfer for measuring the human body which shall be self-accommodating, so as to adapt itself to the part upon which it is applied, and which will afford certain desired points from which to measure with the tape; also, to so construct the said device that it will lie flatly upon the cloth and allow the different measures obtained to be readily and accurately transferred upon the cloth; also, to provide for readily reversing the transfer for either the right or left side of the body, as circumstances require, all of which will be hereinafter explained.

The following description of my invention will enable others skilled in the art to understand it.

Before describing the method of using the improved instrument I will describe the form and construction of the instrument itself.

In the accompanying drawing, A represents a standard, which rises perpendicularly from a base-strip, E, having affixed to its ends small buttons *d d'*. This standard, as well as its base E, are made of thin steel strips riveted together in such manner that the standard curves backward from above downward, so as to correspond to the convexity of the natural breast. The upper end of the standard E terminates in a triangle, to which is pivoted, at *a*, a curved strip, B, having a button, *b'*, on one end, and through the other end is a hole, which, by vibrating the strip, will receive either one or the other of two buttons, *b b*. The strip B is curved so as to conform to the curve of the standard A and adapt itself to the convexity of the shoulder in front. C and D are two narrow strips of steel, which are sprung in making them, so that they will adapt themselves to the lateral rotundity of the natural breast when they are secured together and applied to the person. The strip C is graduated into inches and fractions of an inch and properly marked off. It is also punched at different points with relation to said marks, leaving button-holes for receiving either one of two buttons, *d d'*, on the base piece E, according as the instrument is adjusted for the right or left side of the body. On the inner side of one end of the piece C a socket piece, *g*, is secured for receiving the lower end of a perpendicular removable "scythe"-strip, G', which is slightly curved and marked off into inches and fractions of inches. On the front side of the strip C, in line with the "scythe" piece G, is a button, *c*, and formed on the extremities of the socket piece *g* are clasping-lips for receiving and holding one end of the strip D. The strip D, which is the longest of the two, has riveted to it a long perpendicular "scythe" piece, G, which is parallel to G' and provided with a button, 13, at its lower end. Through the strips C, D, and G, at their point of intersection, a hole is made for receiving one or the other of the buttons *d d'*, which will fasten the parts C, D, and E together at this point. By means of a small turn-button on the piece G, which will overlap the edge of the base piece E, the button *d* or *d'* is prevented from casually slipping out of its hole through piece C. The piece D is connected to both buttons *d d'* and to clasping-lips *e* on the base piece E, and it is also connected to the strip C by means of a clasp, *n*. When the strip C is disconnected from the button on the base-strip E it is free to slide by means of the clasps above named, and the "scythe" pieces G G' can be adjusted and set further apart or nearer together. By detaching the buttons *d d'* from the pieces C D the standard A can be adjusted on the strip D. If desirable, buttons may be affixed to the ends of the strip D for receiving a strap to fasten the instrument around the body; but this I do not consider necessary, as the parts will hold themselves in proper position on the body by the resiliency of the steel strips composing it.

To take the measure, the instrument is adjusted on the body, as shown in Figs. 2 and 3, the horizontal strips C and D lying close up under the arm, and the "scythe" piece being adjusted against the shoulder before and behind, while the standard A lies smoothly upon the front part of the breast. Previous, however, to applying the instrument, I measure from the "neck-bone" to a given point between the shoulders, make a mark at this point, and note the distance; thence to the natural waist, and note this measure. I then proceed as follows, using a tape measure with a ring fastened to one end: Measure from $c$ to 4, from $c$ to 2, from $c$ to 1. Note distance from $c$ to 5 by "scythe"-piece G'. This completes the measurement for the back. I then proceed again and measure from $b'$ to 2, $b'$ to 8, $b'$ to 1. Then from $b$ to 8, ($b$ to 9 for a coat to button close to throat,) from $d$ to 9, $d$ to 12, from $b$ to 5. For the waist-measure, from 13 to 3, from 13 to the line $x$. This line $x$ is the front line of the fore part. Instead of fitting the "scythe" piece G' into a socket in strip C, this piece may be pivoted to the strip C, so that it can be readily reversed for right or left measures and transfers.

Having thus described my invention, what I claim as new, and desire to secure by Letters Patent, is—

1. The flexible standard A on base piece E, in combination with the pivoted strip B, substantially as described.

2. The scythe-strip G' applied to the adjustable strip C, in combination with the scythe piece G, its strip D, and button-fastenings on the base-strip E, substantially as described.

3. The combination of the parts A, C, and D with the scythe-strips G G' and clasps $e\ n$, substantially as described.

GEORGE W. T. HARLEY.

Witnesses:
JOHN W. BROSIUS,
OTIS JOHNSON.